United States Patent [19]

Akashi et al.

[11] Patent Number: 4,603,596

[45] Date of Patent: Aug. 5, 1986

[54] ACTUATION SYSTEM FOR TRANSMISSION SYNCHRONIZER PROVIDING REGULATED ENGAGEMENT PRESSURE

[75] Inventors: Teruo Akashi; Hiroshi Ito; Shigemichi Yamada, all of Toyota, Japan

[73] Assignee: Toyota Jidosha Kabushiki Kaisha, Toyota, Japan

[21] Appl. No.: 473,218

[22] Filed: Mar. 8, 1983

[30] Foreign Application Priority Data

Apr. 23, 1982 [JP] Japan .................. 57-68409

[51] Int. Cl.⁴ .......................... F16H 5/40; F16H 3/08; B60K 41/02; F16D 21/04
[52] U.S. Cl. .................................. 74/336 R; 74/339; 74/364; 74/866; 74/867; 192/0.052
[58] Field of Search ............. 74/339, 364, 365, 336 R, 74/337, 335, 867, 866; 192/0.052, 0.076

[56] References Cited

U.S. PATENT DOCUMENTS

| | | | |
|---|---|---|---|
| 2,928,290 | 3/1960 | Hosea et al. | 74/365 |
| 2,943,502 | 7/1960 | Perkins et al. | 74/365 |
| 3,182,778 | 5/1965 | Dröschel | 74/339 |
| 3,417,640 | 12/1968 | Schmidt et al. | 74/339 |
| 3,422,939 | 1/1969 | Henry-Biabaud | 74/364 |
| 3,530,668 | 9/1970 | Siebers et al. | 74/866 |
| 3,808,738 | 5/1974 | Siebers et al. | 74/339 |
| 3,808,903 | 5/1974 | Sauer | 74/335 |
| 3,863,518 | 2/1975 | Webber et al. | 74/346 |
| 3,889,547 | 6/1975 | Sun et al. | 74/336 |
| 4,073,198 | 2/1978 | Ford | 74/365 |
| 4,194,410 | 3/1980 | Richards | 74/339 |
| 4,345,489 | 8/1982 | Müller et al. | 74/866 |
| 4,367,528 | 1/1983 | Kawamoto et al. | 74/866 |
| 4,394,827 | 7/1983 | Kubo et al. | 74/867 |

FOREIGN PATENT DOCUMENTS 0019857 2/1977 Japan ..................... 74/339

Primary Examiner—William F. Pate, III
Assistant Examiner—David Novais
Attorney, Agent, or Firm—Oblon, Fisher, Spivak, McClelland & Maier

[57] ABSTRACT

An actuation system for a transmission synchronizer, including a first member and a second member, the second member being pressed against the first member for synchronization of two relatively rotating elements, includes a variable pressure type actuator which selectively presses the second member against the first member, with a pressing force which is controllable to vary over a range so as to press the second member against the first member at a lower pressure in the initial phase of synchronization and at a substantially increased pressure at the end of synchronization.

5 Claims, 4 Drawing Figures

ACTUATION SYSTEM FOR TRANSMISSION SYNCHRONIZER PROVIDING REGULATED ENGAGEMENT PRESSURE

BACKGROUND OF THE INVENTION

The present invention relates to an actuation system for a transmission synchronizer, and more particularly relates to an actuation system for such a transmission synchronizer which can operate automatically and which yet can provide smooth and accurate engagement of speed stages of the transmission.

In a transmission which includes one or more synchronizers, such a synchronizer (which may be for example of a so called Borg Warner type) typically includes a first member which is pushed against a second member in order to synchronize the relative rotational speeds of two mutually rotating elements of the transmission, usually as a preliminary to securely engaging these elements rotationally together. For example, in a particular example of construction, in the case that it is desired to rotationally engage a gear wheel to a shaft on which it is rotatably mounted, said gear wheel and said shaft being currently in the state of being rotated at different rotational speeds but the rotational speed of at least one of them being able to be progressively altered by a certain moderate applied torque, then a synchronizer sleeve rotationally coupled to the shaft but axially free to slide thereon is pushed against a ring member which is pushed against a cone member which is rotationally coupled to the gear wheel which is axially fixed in position, and by the compressed sandwiching of these members between the synchronizer sleeve which is being axially pushed and the gear wheel rotating with respect thereto a mutual torque or couple is generated between the shaft and the gear wheel in the relative rotational direction to bring their absolute rotational speeds to be the same, in other words in the relative rotational direction to bring their relative rotational speed to zero. When this has happened, in other words when the synchronizer action has brought the gear wheel and the shaft to rotate at the same rotational speed, then a different mechanism incorporating for example a key mechanism securely and positively rotationally connects the gear wheel to the shaft, without relying on the frictional effect of the above described synchronizer parts; but this is not directly relevant to the actual synchronizing action of the synchronizer. The synchronizer sleeve is typically driven in the axial direction by a fork engaged thereto which is slidably mounted on a fork shaft or the like. Such a fork may be manually driven by the hand of a vehicle operator pushing a gear lever, or may be power driven by an actuator, in the case of the transmission being an automatic transmission, for example.

Now, the load, frictional force, heat, and stress generated in the various members of the synchronizer, i.e. in the above example in the synchronizer sleeve, the ring member, and the cone member, are generally the greater the greater is the relative rotational speed of the members whose rotation is to be synchronized, i.e. in the above example the relative rotational speed of the shaft and the gear wheel, and are also generally the greater the greater is the pressure with which the synchronizer sleeve is pushed, i.e. in the above example the greater is the compression force squeezing the parts together. In order to preserve the service life of the synchronizer mechanism as a whole the load, frictional force, heat, and strain generated in the members of the synchronizer must be kept within acceptable limits, since otherwise the mechanism will quickly be deteriorated and will suffer an unacceptable loss of synchronization function. Now, in the case that the synchronizer sleeve is axially manually driven by the hand of a vehicle operator pushing a gear lever, then an almost unconscious feedback relating to the back pressure from the interaction of the synchronizer sleeve and the ring member and the cone member, etc., operates to help to ensure that not too rough an action is exerted, in other words that a slick and smooth synchronizing action is available, at least in the case of a skilled vehicle operator who is in mental tune with the operation of the machinery; but, in the case that the axial movement of the synchronizer sleeve is performed mechanically by the action of an actuator, then the unconscious yet subtle regulatory action of human operation and touch is not available, and in the prior art it has been a real problem to secure smooth and slick synchronizer action for engaging speed stages of the transmission, without running the risk that the synchronizer sleeve should be abruptly and over violently jammed in the direction of the gear wheel, thus "crunching the gears" and damaging the various parts of the synchronizer by generating too much heat and frictional stress therein, nor running the counterpart risk that by pushing the synchronizer sleeve too weakly towards the gear wheel the synchronization action should be performed so slowly that steady buildup of frictional heat in the synchronizer parts should similarly damage the synchronizer.

The difficulty of regulating this synchronizer action is made the greater, because the synchronizer is operated in a wide range of operational conditions, with regard to rotational speeds of the two members thereof, load being transmitted thereby, and the like.

SUMMARY OF THE INVENTION

Accordingly, it is the primary object of the present invention to provide an actuation system for a transmission synchronizer, which can operate the synchronizer by a mechanical system, in a satisfactory manner.

It is a further object of the present invention to provide an actuation system for a transmission synchronizer, which mechanically operates the synchronizer by pushing a sleeve member or the like thereof, without causing over violent and abrupt pushing of said pushed member.

It is a further object of the present invention to provide an actuation system for a transmission synchronizer, which mechanically operates the synchronizer by pushing a sleeve member or the like thereof, without causing over gentle and weak pushing of said pushed member.

It is a further object of the present invention to provide an actuation system for a transmission synchronizer, which engages the synchronizer positively and effectually without generating any undue load or stress in the members thereof.

It is a further object of the present invention to provide an actuation system for a transmission synchronizer, which engages the synchronizer positively and effectually without generating any undue heat or frictional force in the members thereof.

It is a further object of the present invention to provide an actuation system for a transmission synchronizer, which keeps the synchronizer operating over a satisfactory service life thereof.

It is a further object of the present invention to provide an actuation system for a transmission synchronizer, which operates the synchronizer mechanically without producing any substantial risk of early and sudden failure thereof.

It is a further object of the present invention to provide an actuation system for a transmission synchronizer, which provides slick and smooth synchronizer operation.

According to the most general aspect of the present invention, these and other objects are accomplished by, for a transmission synchronizer comprising a first member and a second member which is selectively pressed against said first member in order to perform synchronization of the revolution speeds of relatively rotating elements within a transmission: an actuation system, comprising: (a) an actuator which selectively presses said second member against said first member, and which can perform said pressing action with a pressing force which is controllable to vary over a range; and (b) a control system which controls said actuator, so as to cause said actuator to thus press said second member against said first member, in such a fashion as to cause the pressing force by which said second member is pressed against said first member in the initial phase of synchronization to be substantially lower than the pressing force by which said second member is pressed against said first member in the final phase of synchronization.

According to such a structure, the second member is relatively moderately pressed against the first member when the relative rotational speed between the first and the second member is high, and then the second member is pressed relatively strongly against the first member in the final phase of synchronization wherein the relative rotational speed between the first and the second member has become low. Therefore, shock, high heat generation, and severe wearing caused to the first and the second member due to abrupt engagement therebetween at high relative rotational speed is effectively avoided.

According to another aspect of the present invention, these and other objects are accomplished by a transmission synchronizer actuation system of the type described above, wherein said control system controls said actuator so as to cause said actuator to press said second member against said first member in such a fashion as to cause the pressing force by which said second member is pressed against said first member to be substantially constant during the process of synchronization from the initial phase of synchronization to just before the final phase of synchronization.

According to such a structure, heat generation due to frictional relative movement between the first and the second member and dissipation of the heat are desirably balanced while keeping the time required for gradually decreasing the relative rotational speed between the first and the second member within an allowable short period.

According to a still further aspect of the present invention, these and other objects are accomplished by a transmission synchronizer actuation system of the sort first described above, wherein said control system controls said actuator so as to cause said actuator to press said second member against said first member in such a fashion as to cause the initial pressing force by which said second member is pressed against said first member to be greater, the higher is the vehicle speed at the moment when synchronization is initiated.

According to such a structure, the time required for synchronization of the two members to be synchronized in speed stage shifts is made generally constant and the precision of control of timing in speed stage shifting is increased.

BRIEF DESCRIPTION OF THE DRAWINGS

The present invention will now be shown and described with reference to a preferred embodiment thereof, and with reference to the illustrative drawings. It should be clearly understood, however, that the description of the embodiment, and the drawings, are all of them given purely for the purposes of explanation and exemplification only, and are none of them intended to be limitative of the scope of the present invention in any way, since the scope of the present invention is to be defined solely by the legitimate and proper scope of the appended claims. In the drawings, like parts and features are denoted by like reference symbols in the various figures thereof, and:

DESCRIPTION OF THE PREFERRED EMBODIMENT

Figure 1:
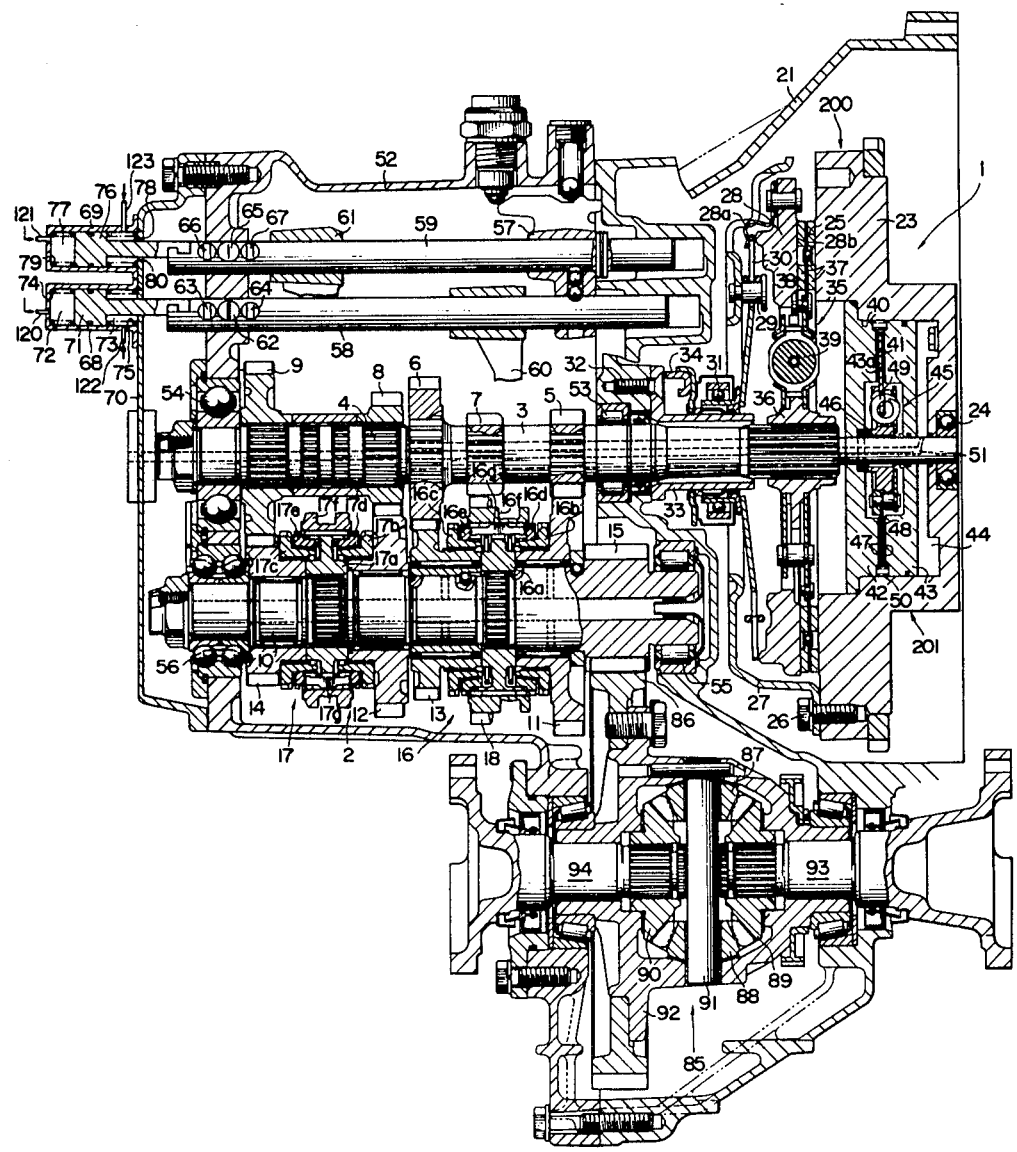
FIG. 1 is a detailed longitudinal sectional constructional view of a transmission mechanism which utilizes two synchronizers which are actuated by two example of the preferred embodiment of the synchronizer actuation system according to the present invention, this particular transmission in fact incorporating two power transmission systems to each of which one of said synchronizers relates.

The present invention will now be described with reference to the preferred embodiment thereof, and with reference to the appended drawings. FIG. 1 shows a transmission mechanism incorporating two examples of the preferred embodiment of the synchronizer actuation system according to the present invention in a detailed longitudinal cross sectional view. In this figure, the reference numeral 1 generally denotes a multiple clutching mechanism, and 2 generally denotes a gear transmission mechanism.

A first hollow driving gear wheel shaft 3 is rotatably mounted in the transmission casing 52 via a bearing 53, extending horizontally across the upper portion of the casing 52 in the figure ("left", "right", "up", and "down" will be used in the sense of the relevant figure hereinafter), and a second substantially solid driving gear wheel shaft 4 is coaxially rotatably mounted within and extending along the tubular space inside the first hollow driving gear wheel shaft 3 on bearings which are not shown in the figure, with the left and right hand ends of the second driving gear wheel shaft 4 each protruding out from the left and right hand ends of said first driving gear wheel shaft 3 for a certain distance, the left hand end of said second solid driving gear wheel shaft 4 being rotatably supported from the transmission casing 52 by another bearing 54. Parallel with the coaxial first and second driving gear wheel shafts 3 and 4 and displaced downwards therefrom there is provided a driven gear wheel shaft 10, which is rotatably supported from the transmission casing 52 by bearings 55 and 56.

On the driven gear wheel shaft 10 there are rotatably mounted in order from the right to the left in FIG. 1, a first speed driven gear wheel 11, a third speed driven gear wheel 13, a second speed driven gear wheel 12, and a fourth speed driven gear wheel 14. On the first driving gear wheel shaft 3 there are fixedly mounted, in order from the right to the left in FIG. 1, a first speed driving gear wheel 5, a reverse speed driving gear wheel 7, and a third speed driving gear wheel 6. On the portion of the second driving gear wheel shaft 4 which projects outwards to the left from the left hand end of the first driving gear wheel shaft 3 there are fixedly mounted, in order from the right to the left in FIG. 1, a second speed driving gear wheel 8 and a fourth speed driving gear wheel 9. The first speed driving gear wheel 5 is in constant mesh with the first speed driven gear wheel 11; the second speed driving gear wheel 8 is in constant mesh with the second speed driven gear wheel 12; the third speed driving gear wheel 6 is in constant mesh with the third speed driven gear wheel 13; and the fourth speed driving gear wheel 9 is in constant mesh with the fourth speed driven gear wheel 14.

Between the first speed driven gear wheel 11 and the third speed driven gear wheel 13 on the driven gear wheel shaft 10 there is fitted a first - third synchronizer 16, which performs the function of synchronizing engagement of the first speed stage and of the third speed stage, as will be understood hereinafter. This first - third synchronizer 16 is of a per se well known sort, in fact being an inertia lock type Borg Warner synchromesh device. The first - third synchronizer 16 comprises a hub 16a which is fixedly mounted on the driven gear wheel shaft 10, a first speed cone member 16b and synchronizer ring 16d associated with the first speed driven gear wheel 11 and a third speed cone member 16c and synchronizer ring 16e associated with the third speed driven gear wheel 13, and a first - third synchronizer sleeve 16f and locking key 16g. The function of this first - third synchronizer 16 is to rotationally couple either the first speed driven gear wheel 11 or the third speed driven gear wheel 13 or neither of them to the driven gear wheel shaft 10, according as the first - third synchronizer sleeve 16f is slid to the right, to the left, or is allowed to remain at its intermediate position. On the outside of the first - third synchronizer sleeve 16f there is formed a reverse speed driven gear wheel 18, the action of which will be explained later, which is substantially coplanar with the reverse speed driving gear wheel 7 on the first driving gear wheel shaft 3.

Between the second speed driven gear wheel 12 and the fourth speed driven gear wheel 14 on the driven gear wheel shaft 10 there is fitted a second - fourth synchronizer 17, which performs the function of synchronizing engagement of the second speed stage and of the fourth speed stage, as will be understood hereinafter. This second - fourth synchronizer 17 is also of a per se well known sort, in fact also being an inertia lock type Borg Warner synchromesh device. The second - fourth synchronizer 17 comprises a hub 17a which is fixedly mounted on the driven gear wheel shaft 10, a second speed cone member 17b and synchronizer ring 17d associated with the second speed driven gear wheel 12 and a fourth speed cone member 17c and synchronizer ring 17e associated with the fourth speed driven gear wheel 14, and a second - fourth synchronizer sleeve 17f and locking key 17g. The function of this second - fourth synchronizer 17 is to rotationally couple either the second speed driven gear wheel 12 or the fourth speed driven gear wheel 14 or neither of them to the driven gear wheel shaft 10, according as the second - fourth synchronizer sleeve 17f is slid to the right, to the left, or is allowed to remain at its intermediate position.

On the right hand end portion of the driven gear wheel shaft 10 there is also fixedly mounted a power output gear wheel 15, which is in constant mesh with a differential power input ring gear 86 of a differential gear mechanism 85, which is of a per se well known sort. The differential gear mechanism 85 comprises a bevel gear wheel case 92 to which said power input ring gear 86 is fixed so as to rotate said bevel gear wheel case 92, and perpendicular to the rotational axis of the bevel gear wheel case 92 there is fixed a bevel gear wheel shaft 19, on which there are rotatably mounted a pair of bevel gear wheels 87 and 88. Also supported rotatably by the casing of the differential gear mechanism 85 as coaxial with the rotational axis of the bevel gear wheel case 92 there are provided left and right power output shafts 93 and 94, to the inner ends of which there are fixed bevel gear wheels 89 and 90, rspectively. These bevel gear wheels 89 and 90 are each in constant mesh with both of the bevel gear wheels 87 and 88. The operation of such a differential mechanism as this differential gear mechanism 85 is per se well known.

Figure 2:
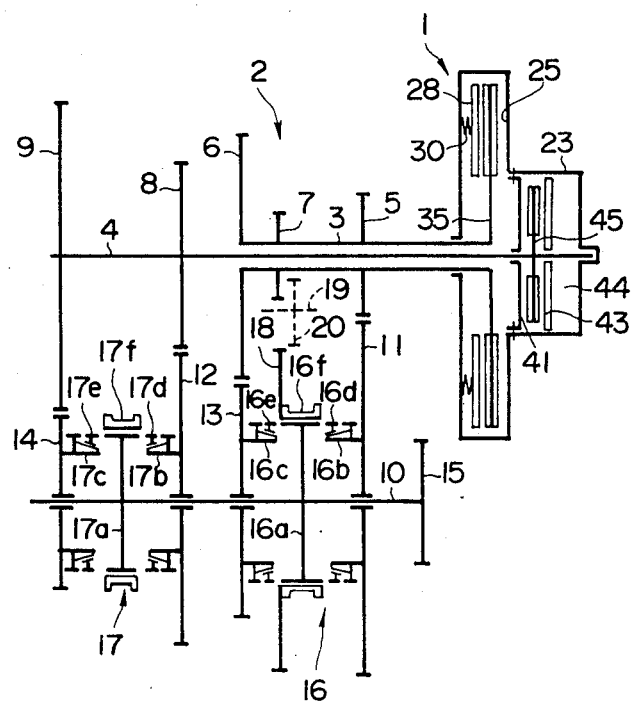
FIG. 2 is a schematic skeleton structural view of the transmission mechanism shown in FIG. 1.

Finally, on a reverse idler gear wheel shaft 19 which is supported as parallel to the first and second driving gear wheel shafts 3 and 4 and the driven gear wheel shaft 10 there is rotatably and slidably mounted a reverse idler gear wheel 20. Neither the reverse idler gear wheel shaft 19 nor the reverse idler gear wheel 20 can be seen in FIG. 1 because they are hidden by other members, but they are schematically shown in FIG. 2. Arrangements which will be described in detail hereinafter are provided for shifting this reverse idler gear wheel 20 to and fro in the left and right directions on the reverse idler gear wheel shaft 19; and, when the reverse idler gear wheel 20 is in its most rightwards position on the reverse idler gear wheel shaft 19, said reverse idler gear wheel 20 does not mesh with any other gear wheels and is therefore free to rotate; but, when the reverse idler gear wheel 20 is in its most leftwards position on the reverse idler gear wheel shaft 19, said reverse idler gear wheel 20 meshes with the reverse speed driving gear wheel 7 and with the reverse speed driven gear wheel 18 formed on the outside of the first - third synchronizer sleeve 16f, so as to provide a reverse speed stage, as will be explained later.

The multiple clutching mechanism 1 is provided within a clutch housing 21, and its power input member 23 is in fact the flywheel of an internal combustion engine not shown in the figure which is used to power the vehicle to which this transmission is fitted. The rotational axis of the power output member of this internal combustion engine is of course coincident with the rotational axis of the first and second driving gear wheel shafts 3 and 4. Between this engine flywheel 23 and the first hollow driving gear wheel shaft 3 there is provided a selectively engagable first clutch assembly 200, and between this engine flywheel 23 and the portion of the second solid driving gear wheel shaft 4 which protrudes from the right hand end of said hollow driving gear wheel shaft 3 there is provided a selectively engagable second clutch assembly 201. This right hand end of the protruding portion of the second solid driving gear wheel shaft 4 and the hub portion of the flywheel 23 are mutually supported by a bearing 24. Thus, according to selective engagement of the first and the second clutch assemblies 200 and 201, either the first driving gear wheel shaft 3 or the second driving gear wheel shaft 4 or neither of them can be powered from said internal combustion engine, so as to be rotated thereby.

The details of the construction of the first clutch assembly 200, which in fact is one of the two clutch assemblies 200 and 201 which is required to transmit the greater torque and which accordingly is the one of the larger radius, are as follows.

The face of the flywheel 23 facing towards the transmission 2 is formed with a flat annular frictional engagement surface 25. A clutch cover 27 is bolted to this right hand face of the flywheel 23 by means of a plurality of bolts 26, only one of which can be seen in FIG. 1. An annular pressure plate member 28 is fitted within the clutch cover 27a movable along the axial line of the first driving gear wheel shaft 3, so as to oppose the frictional engagement surface 25. A plate or diaphragm spring 30 which is formed as an annulus is provided between the clutch cover 27 and the clutch plate member 28: in detail, a radially intermediate annular portion of the spring 30 is flexibly connected to the clutch cover 27 by a plurality of pin type fasteners 29, only one of which can be seen in FIG. 1 but which in fact are provided in a plurality as spaced around said radially intermediate annular portion, and the radially outer annular portion of the spring 30 is flexibly connected to the clutch plate member 28 by a plurality of spring type fasteners 28a, again only one of which can be seen in FIG. 1 but which in fact are again provided in a plurality as spaced around said radially outer annular portion.

A clutch disk assembly 35 is provided between the clutch plate member 28 and the opposing annular frictional engagement surface 25 of the flywheel 23. This clutch disk assembly 35 comprises a hub member 36 which is rotationally connected by splines to the first driving gear wheel shaft 3, an annular disk plate 38 which is sandwiched between the annular frictional engagement surface 25 of the flywheel 23 and the opposing annular pressure surface 28b of the clutch plate member 28, and a torsional or annular type shock absorber assembly 39 of a per se well known kind which connects the disk plate 38 and the hub member 36 with a certain amount of rotational resilience therebetween. Both the sides of the annular disk plate 38 are faced with high friction type clutch linings 37, so as to have a good frictional effect against the opposing frictional surfaces 28b and 25.

The radially inner portion of the plate spring 30 is formed as a tubular member which is axially drivingly connected with a clutch driving fork 34, via a clutch release bearing 31 which allows relative rotational movement but prevents relative axial motion therebetween and which is slidably mounted on a sleeve member 33 which is fitted over the first hollow driving gear wheel shaft 3 and which is fixed to the clutch housing 21 by a plurality of bolts 32 only one of which can be seen in FIG. 1. Only one end of the clutch driving fork 34 can be seen in FIG. 1, but in fact this fork 34 is formed as a bar type member, an intermediate portion of which is pivoted to the transmission casing 52, and the other end of which is drivingly connected to the piston of a hydraulic actuator 95 which will be described later with reference to the schematic diagram of FIG. 3.

Thus, when the hydraulic fluid pressure chamber 96 of the hydraulic actuator 95 is not supplied with pressurized hydraulic fluid and thus does not drive the not shown other end of this clutch fork member 34, then the radially central portion of the plate spring 30 is not driven thereby in the rightwards direction in FIG. 1, and thus the spring action of the spring 30, by levering in a circular pivoting fashion around the pin type fasteners 29 according to the resilient action of the spring 30, causes its outer peripheral portion to be strongly impelled in the rightwards direction and to press, via the spring type fasteners 28a, the clutch pressure plate member 28 towards the opposing frictional engagement face 25 of the flywheel 23. In this operational mode, the annular disk plate 38 is tightly clamped between the opposing frictional surfaces 28b and 25, respectively, of the clutch plate member 28 and the flywheel 23, and is frictionally coupled thereto; and thereby the first driving gear wheel shaft 3 is rotationally powered from the internal combustion engine (not shown). On the other hand, when the hydraulic fluid pressure chamber 96 of the hydraulic actuator 95 is supplied with pressurized hydraulic fluid and thus drives the other end of this clutch fork member 34, then the radially central portion of the spring 30 is driven thereby in the rightwards direction in FIG. 1, and this overcomes the spring action of the spring 30 by levering this spring 30 in a circular pivoting fashion around the pin type fasteners 29, thus causing its outer peripheral portion to be moved in the leftwards direction and thus to cease to press the clutch pressure plate member 28 towards the opposing frictional engagement face 25 of the flywheel 23. In this operational mode, the annular disk plate 38 is not substantially squeezed between the opposing frictional surfaces 28b and 25 of the clutch plate member 28 and the flywheel 23, and accordingly is free to rotate with respect thereto; and thereby the first driving gear wheel shaft 3 is not substantially rotationally powered from the internal combustion engine.

The details of the construction of the second clutch assembly 201, which in fact is the one of the two clutch assemblies 200 and 201 which is required to transmit the lesser torque and which accordingly is the one of the smaller radius, are as follows.

The inner portion of the flywheel 23 is formed with a cylndrical cavity, facing towards the transmission 2, which has a cylindrical inner surface 40. This cavity is substantially pressure sealed in the rightwards direction in the figure by the cooperation of the second driving gear wheel shaft 4 and the radially inner portion of the flywheel 23, optionally with the interposition of a seal member therebetween. A clutch plate member 42 is fitted into the open left end of this cavity so as substantially to close it, and the inner or right hand surface of this clutch plate member 42 is formed as a flat annular frictional engagement surface 41. A piston member 43 is fitted within the cavity of the flywheel 23 as movable along the axial line of the second driving gear wheel shaft 4, and is slidably and rotatably and pressure sealingly engaged, optionally with the interposition of a seal member therebetween, over the end portion of said second driving gear wheel shaft 4, so that the left hand side of the piston member 43 opposes the frictional engagement surface 41 of the clutch plate member 42. The outer cylindrical surface of the piston member 43 slides on the inner cylindrical surface 40 of the cavity in the flywheel 23 in a pressure sealed fashion, optionally with the interposition of a seal member therebetween. Thus a pressure chamber 44 is defined to the right of the piston member 42, between it and the flywheel 23. A clutch disk assembly 45 is provided between the piston member 43 and the opposing frictional engagement surface 41 of the clutch plate member 42. This clutch disk assembly 45 comprises a hub member 46 which is rotationally connected by splines to the second driving gear wheel shaft 4, an annular disk plate 48 which is sandwiched between the annular frictional engagement surface 41 of the clutch plate member 42 and the opposing pressure surface of the piston member 43, and a torsional or annular type shock absorber assembly 49 of a per se well known kind which connects the disk plate 48 and the hub member 46 with a certain amount of rotational resilience therebetween. Both the sides of the annular disk plate 48 are faced with high friction type clutch linings 47, so as to have a good frictional effect against the frictional engagement surfaces opposing them. A return spring 50 is fitted between the piston member 43 and the opposing frictional engagement surface 41 of the clutch plate member 42, radially outwards of the annular disk plate 48, so as to bias these members away from one another and so as to tend to decrease the size of the pressure chamber 44. And a hydraulic fluid conduit 51 is formed through the center of the second driving gear wheel shaft 4 and opens to the pressur chamber 44, for selectively supplying pressurized hydraulic fluid to said pressure chamber 44.

Thus, when the hydraulic fluid pressure chamber 44 is not supplied with pressurized hydraulic fluid via the conduit 51 and thus does not drive the piston member 43 to the left, then under the biasing action of the return spring 50 the piston member 43 is impelled in the rightwards direction and thus is not pressed towards the opposing frictional engagement face 41 of the clutch plate member 42. In this operational mode, the annular disk plate 48 is not substantially squeezed between the frictional surface 41 of the clutch plate member 42 and the piston member 43, and accordingly is free to rotate with respect thereto; and thereby the second driving gear wheel shaft 4 is not substantially rotationally powered from the internal combustion engine (not shown). On the other hand, when the hydraulic fluid pressure chamber 44 is supplied with pressurized hydraulic fluid of greater pressure value than a predetermined value via the conduit 51 and thus the piston member 43 is driven to the left, this overcomes the spring action of the spring 50, and in this operational mode the annular disk plate 48 is tightly clamped between the opposing frictional surface 41 of the clutch plate member 42 and the piston member 43, and accordingly is frictionally coupled thereto; and thereby the second driving gear wheel shaft 4 is rotationally powered from the internal combustion engine.

Thus, it will be particularly noted that the functional operations of the first and second clutching assemblies 200 and 201 are opposite: whereas the first clutching assembly 200 is engaged so as to transmit engine rotational power to the first driving gear wheel shaft 3 when its pressure chamber (the chamber 96) is not supplied with hydraulic fluid pressure, and is disengaged so as not to transmit engine rotational power to the first driving gear wheel shaft 3 when its pressure chamber is supplied with hydraulic fluid pressure, by contrast the second clutching assembly 201 is engaged so as to transmit engine rotational power to the second driving gear wheel shaft 4 when its pressure chamber (the chamber 44) is supplied with hydraulic fluid pressure, and is disengaged so as not to transmit engine rotational power to the second driving gear wheel shaft 4 when its pressure chamber is not supplied with hydraulic fluid pressure.

Parallel to the first and second driving gear wheel shafts 3 and 4 and the driven gear wheel shaft 10 there are slidably supported in an upper portion of the transmission casing 52 first and second selector fork shafts 58 and 59. On the first selector fork shaft 58 there is fixedly mounted a first selector fork 60, which can only be partly seen in the sectional view of FIG. 1, and which is engaged with the sleeve 16f of the first - third synchronizer 16 so as selectively to drive said synchronizer sleeve 16f in the left and right directions, along the axial direction of the synchronizer. Likewise, on the second selector fork shaft 59 there is fixedly mounted a second selector fork 61, which also can only be partly seen in the sectional view of FIG. 1, and which is engaged with the sleeve 17f of the second - fourth synchronizer 17 so as selectively to drive said synchronizer sleeve 17f in the left and right directions, along the axial direction of the synchronizer. Further, on this second selector fork shaft 59 there is also slidably mounted a reverse speed selector fork 57, which also can only be partly seen in the sectional view of FIG. 1, and which is engaged with the reverse idler gear wheel 20, so as selectively to drive said reverse idler ger wheel 20 in the left and right directions along the axial direction of the reverse idler gear wheel shaft 19, so as selectively to mesh said reverse idler gear wheel 20 with the reverse speed driving gear wheel 7 and with the reverse speed driven gear wheel 18 formed on the outside of the first - third synchronizer sleeve 16f, in order to provide the reverse speed stage. On a left end portion of the first selector fork shaft 58 where it is slidably fitted through a hole in the transmission casing 52 there are formed three axially spaced apart click stop grooves or indentations 62, 63, and 64, and according to the axial position of the first selector fork shaft 58 one or another of these three click stop grooves 62, 63, and 64 is engaged with a ball not shown in the figure which is fitted into an hole in the side of said hole in the transmission casing 52 and which is biased against the side of the shaft 58 by a spring or the like; and similarly on a left end portion of the second selector fork shaft 59 where it is slidably fitted through a hole in the transmission casing 52 there are formed three axially spaced apart click stop grooves or indentations 65, 66, and 67, and according to the axial position of the second selector fork shaft 59 one or another of these three click stop grooves 65, 66, and 67 is engaged with a ball not shown in the figure which is fitted into an hole in the side of said hole in the transmission casing 52 and which is biased against the side of the shaft 59 by a spring or the like.

By means of this click stop mechanism, the first selector fork shaft 58 can be shifted between a central or neutral position in which its said ball is engaged with its central click stop groove 62, a rightwardly shifted position in which its said ball is engaged with its said left click stop groove 63, and a leftwardly shifted position in which its said ball is engaged with its said right click stop groove 64; and when said first selector fork shaft 58 is in any one of its said three positions it is retained therein with a certain holding force by the above described click stop mechanism. Similarly, the second selector fork shaft 59 can be shifted between a central or neutral position in which its said ball is engaged with its said central click stop groove 65, a rightwardly shifted position in which its said ball is engaged with its said left click stop groove 66, and a leftwardly shifted position in which its said ball is engaged with its said right click stop groove 67; and when said second selector fork shaft 59 is in any one of its said three positions it is similarly retained therein with a certain holding force by the above described click stop mechanism. When the first selector fork shaft 58 is in its said central or neutral position, then the first selector fork 60 positions the sleeve 16f of the first - third synchronizer 16 to its intermediate position in which neither the first speed driven gear wheel 11 nor the third speed driven gear wheel 13 is rotationally coupled by the first - third synchronizer 16 to the driven gear wheel shaft 10. When the first selector fork shaft 58 is in its said rightwardly shifted position, then the first selector fork 60 positions the sleeve 16f of the first - third synchronizer 16 to its rightwardly shifted position in which the first speed driven gear wheel 11 is rotationally coupled by the first - third synchronizer 16 to the driven gear wheel shaft 10. On the other hand, when the first selector fork shaft 58 is in its said leftwardly shifted position, then the first selector fork 60 positions the sleeve 16f of the first - third synchronizer 16 to its leftwardly shifted position in which the third speed driven gear wheel 13 is rotationally coupled by the first - third synchronizer 16 to the driven gear wheel shaft 10. Similarly, when the second selector fork shaft 59 is in its said central or neutral position then the second selector fork 61 positions the sleeve 17f of the second - fourth synchronizer 17 to its intermediate position in which neither the second speed driven gear wheel 12 nor the fourth speed driven gear wheel 14 is rotationally coupled by the second - fourth synchronizer 17 to the driven gear wheel shaft 10. When the second selector fork shaft 59 is in its said rightwardly shifted position, then the second selector fork 61 positions the sleeve 17f of the second - fourth synchronizer 17 to its rightwardly shifted position in which the second speed driven gear wheel 12 is rotationally coupled by the second - fourth synchronizer 17 to the driven gear wheel shaft 10. On the other hand, when the second selector fork shaft 59 is in its said leftwardly shifted position, then the second selector fork 61 positions the sleeve 17f of the second - fourth synchronizer 17 to its leftwardly shifted position in which the fourth speed driven gear wheel 14 is rotationally coupled by the second - fourth synchronizer 17 to the driven gear wheel shaft 10.

The first and second selector fork shafts 58 and 59 and the reverse speed selector fork 57 are driven between their positions explained above by hydraulic drive mechanisms which will now be described.

On the left hand end of the transmission casing 52 there is fitted an end cover 70, through which there are pierced two holes which oppose the left hand ends of the first and second selector fork shafts 58 and 59, which are formed with notch shapes. To this end cover 70 are fixed the casings of first and second hydraulic actuators 68 and 69. Within the casing of the first hydraulic actuator 68 there is slidably fitted a first piston member 71, the right hand end of which protrudes from the casing and is formed with a notch shape which is drivingly engaged with the notch shape formed on the left hand end of the first selector fork shaft 58 so as to push and pull it. Pressure chambers 72 and 73 are respectively defined to the left and the right of this piston member 71 within the casing of the hydraulic actuator, and opposing compression coil springs 74 and 75 respectively mounted within the pressure chamber 72 and the pressure chamber 73 bias this piston member 71 together with the first selector fork shaft 58 respectively to the right and the left in FIG. 1. Similarly, within the casing of the second hydraulic actuator 69 there is slidably fitted a second piston member 76, the right hand end of which protrudes from the casing and is formed with a notch shape which is drivingly engaged with the notch shape formed on the left hand end of the second selector fork shaft 59 so as to push and pull it. Pressure chambers 77 and 78 are respectively defined to the left and the right of this piston member 76 within the casing of the hydraulic actuator, and opposing compression coil springs 79 and 80 respectively mounted within the pressure chamber 77 and the pressure chamber 78 bias this piston member 76 together with the second selector fork shaft 59 respectively to the right and the left in FIG. 1. To the pressure chambers 73, 74, 77, and 78 there are respectively communicated hydraulic fluid conduits 122, 120, 121, and 123.

Thus, when pressurized hydraulic fluid is supplied neither to the pressure chamber 72 of the first hydraulic actuator 68 via the hydraulic fluid conduit 120 nor to its pressure chamber 73 via the hydraulic fluid conduit 122, then under the biasing actions of the compression coil springs 74 and 75 the piston member 71 thereof is shifted so as to position the first selector fork shaft 58 to its central or neutral position, in which its said ball is engaged with its said central click stop groove 62, and in which the first selector fork 60 positions the sleeve 16f of the first - third synchronizer 16 to its intermediate position in which neither the first speed driven gear wheel 11 nor the third speed driven gear wheel 13 is rotationally coupled by the first - third synchronizer 16 to the driven gear wheel shaft 10. When pressurized hydraulic fluid is supplied via the hydraulic fluid conduit 120 to the pressure chamber 72 of the first hydraulic actuator 68, then with the aid of the biasing action of the compression coil spring 74 and against the biasing action of the compression coil spring 75 which is overcome the piston member 71 thereof is shifted to the right, with a shifting force which is greater the greater is the magnitude of the pressure of such supplied hydraulic fluid, so as to position the first selector fork shaft 58 to its said rightwardly shifted position, in which its said ball is engaged with its said left click stop groove 63, and in which the first selector fork 60 positions the sleeve 16f of the first - third synchronizer 16 to its said rightwardly shifted position in which the first speed driven gear wheel 11 is rotationally coupled by the first - third synchronizer 16 to the driven gear wheel shaft 10. On the other hand, when pressurized hydraulic fluid is supplied via the hydraulic fluid conduit 122 to the pressure chamber 73 of the first hydraulic actuator 68, then with the aid of the biasing action of the compression coil spring 75 and against the biasing action of the compression coil spring 74 which is overcome the piston member 71 thereof is shifted to the left, again with a shifting force which is greater the greater is the magnitude of the pressure of such supplied hydraulic fluid, so as to position the first selector fork shaft 58 to its said leftwardly shifted position, in which its said right click stop groove 64, and in which the first selector fork 60 positions the sleeve 16f of the first - third synchronizer 16 to its said leftwardly shifted position in which the third speed driven gear wheel 13 is rotationally coupled by the first - third synchronizer 16 to the driven gear wheel shaft 10.

Similarly, when pressurized hydraulic fluid is supplied neither to the pressure chamber 77 of the second hydraulic actuator 69 via the hydraulic fluid conduit 121 nor to its pressure chamber 78 via the hydraulic fluid conduit 123, then under the biasing actions of the compression coil springs 79 and 80 the piston member 76 thereof is shifted so as to position the second selector fork shaft 59 to its central or neutral position, in which its said ball is engaged with its said central click stop groove 65, and in which the second selector fork 61 positions the sleeve 17f of the second - fourth synchronizer 17 to its intermediate position in which neither the second speed driven gear wheel 12 nor the fourth speed driven gear wheel 14 is rotationally coupled by the second - fourth synchronizer 17 to the driven gear wheel shaft 10. When pressurized hydraulic fluid is supplied via the hydraulic fluid conduit 121 to the pressure chamber 77 of the second hydraulic actuator 69, then with the aid of the biasing action of the compression coil spring 79 and against the biasing action of the compression coil spring 80 which is overcome the piston member 76 thereof is shifted to the right, with a shifting force which is greater the greater is the magnitude of the pressure of such supplied hydraulic fluid, so as to position the second selector fork shaft 59 to its said rightwardly shifted position, in which its said ball is engaged with its said left click stop groove 66, and in which the second selector fork 61 positions the sleeve 17f of the second - fourth synchronizer 17 to its said rightwardly shifted position in which the second speed driven gear wheel 12 is rotationally coupled by the second - fourth synchronizer 17 to the driven gear wheel shaft 10. On the other hand, when pressurized hydraulic fluid is supplied via the hydraulic fluid conduit 123 to the pressure chamber 78 of the second hydraulic actuator 69, then with the aid of the biasing action of the compression coil spring 80 and against the biasing action of the compression coil spring 79 which is overcome the piston member 76 thereof is shifted to the left, again with a shifting force which is greater the greater is the magnitude of the pressure of such supplied hydraulic fluid, so as to position the second selector fork shaft 59 to its said leftwardly shifted position, in which its said ball is engaged with its said right click stop groove 67, and in which the second selector fork 61 positions the sleeve 17f of the second - fourth synchronizer 17 to its said leftwardly shifted position in which the fourth speed driven gear wheel 14 is rotationally coupled by the second - fourth synchronizer 17 to the driven gear wheel shaft 10.

Figure 3:
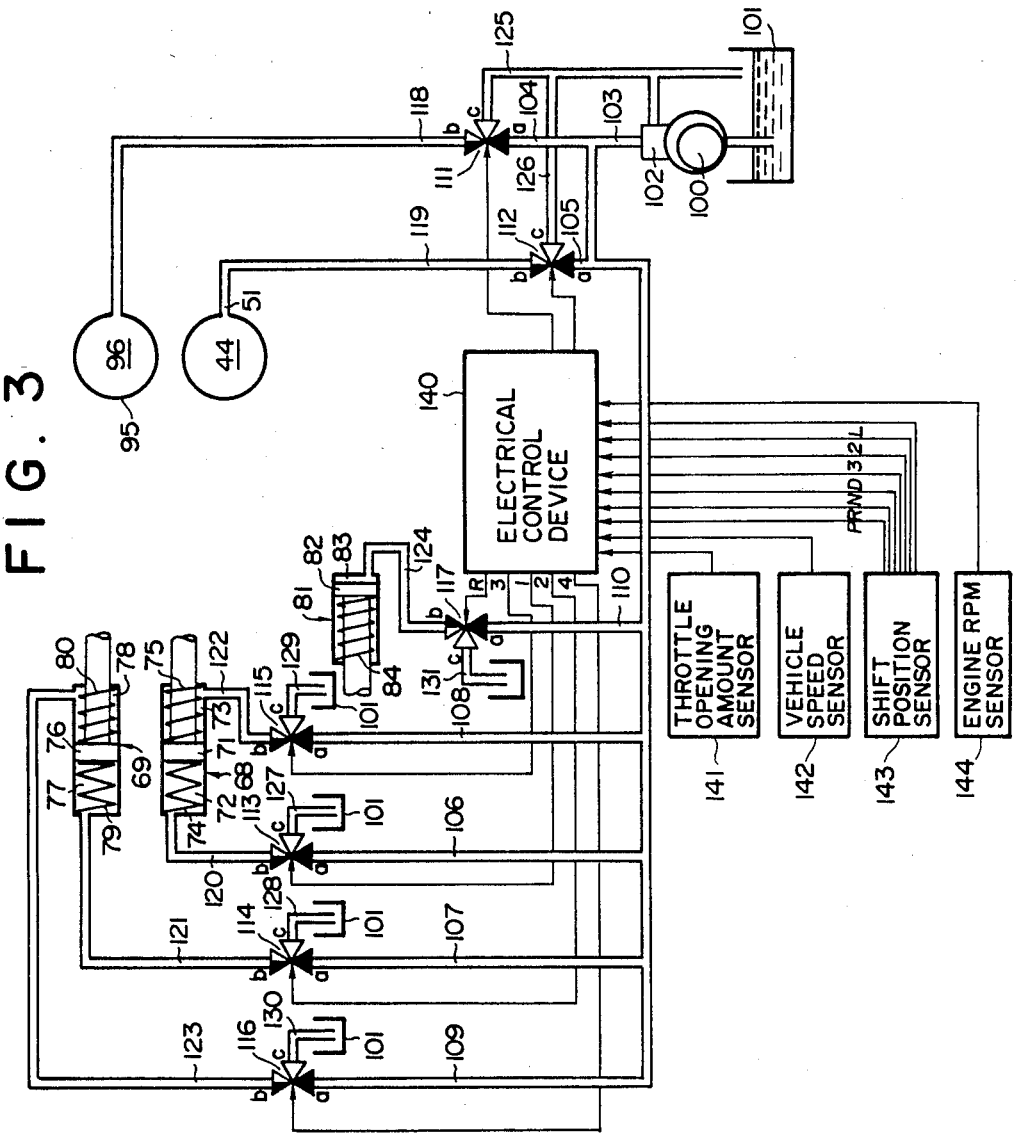
FIG. 3 is a schematic view, in part block diagrammatical form, showing part of a combination electric/hydraulic control system for the transmission, and elements associated therewith.

Finally, the reverse speed selector fork 57 is selectively driven to and fro to the left and right in FIG. 1 by a hydraulic actuator 81, which is not shown in FIG. 1 but is shown in FIG. 3. When the pressure chamber 83 of this hydraulic actuator 81 is not supplied with pressurized hydraulic fluid, then by the biasing action of a compression coil spring 84 the piston 82 is driven to the right in FIG. 3, and via a linkage which is not shown this piston 82 thereby shifts the reverse speed selector fork 57 in the rightwards direction in FIG. 1, so as to disengage the reverse idler gear wheel 20 from the reverse speed driving gear wheel 7 and from the reverse speed driven gear wheel 18 formed on the outside of the first - third synchronizer sleeve 16f. On the other hand, when the pressure chamber 83 of this hydraulic actuator 81 is supplied with pressurized hydraulic fluid, then against the biasing action of the compression coil spring 84 which is overcome the piston 82 is driven to the left in FIG. 3, and via the aforesaid linkage the piston 82 thereby shifts the reverse speed selector fork 57 in the leftwards direction in FIG. 1, so as to mesh the reverse idler gear wheel 20 with the reverse speed driving gear wheel 7 and with the reverse speed driven gear wheel 18, so as to provide the reverse speed stage.

The operation of the transmission mechanism shown in FIG. 1 will not be explained in very great detail, because an intimate understanding of the functioning thereof is not required for comprehension of the principles of the present invention; however, an abbreviated summary thereof will be given. In this connection, the arrangements for providing selective engagement and disengagement of the first and second clutch assemblies 200 and 201 by selectively providing supply of hydraulic fluid pressure to the pressure chambers 44 and 96, and for moving the selector forks 57, 60 and 61 by selectively providing supply of hydraulic fluid pressure to the pressure chambers 83, 72, 73, 77, and 78, according to operational parameters of the vehicle comprising this transmission mechanism, will be described shortly.

The engagement conditions of each of the first and second clutch assemblies 200 and 201, the positions of the first - third synchronizer sleeve 16f of the first - third synchronizer 16 and of the second - fourth synchronizer sleeve 17f of the second - fourth synchronizer 17, and the position of the reverse idler gear wheel 20 on the reverse idler gear wheel shaft 19, will now be explained, during the engagement of each of the speed stages which can be provided by the transmission mechanism shown in FIG. 1 and explained above, i.e. during the engagement of the neutral speed stage, the reverse speed stage, and the first through the fourth forward speed stages; and also the sequences of shifting and of engagement and disengagement operations of these means which are employed in the various possible operations of shifting between these speed stages will be generally explained. These conditions and sequences will be described in the case that the transmission mechanism is being used as a full automatic transmission mechanism, although other modes of operation are possible.

During vehicle operation in the neutral speed stage, the first - third synchronizer sleeve 16f of the first - third synchronizer 16 and of the second - fourth synchronizer sleeve 17f of the second - fourth synchronizer 17 are both positioned to their central or intermediate positions, and the first and second clutch assemblies 200 and 201 are both disengaged, although in fact the engagement condition of the second clutch assembly 201 is irrelevant. However, when it is desired to engage the first speed stage from the neutral speed stage, as a preparatory step first the first - third synchronizer sleeve 16f of the first - third synchronizer 16 is shifted to its rightwards position, so as to rotationally engage the first speed driven gear wheel 11 with the driven gear wheel shaft 10, but at this time no drive will be transferred by this rotational engagement because the first clutch assembly 200 is disengaged. Then, in order to actually engage this first speed stage, the first clutch assembly 200 is engaged.

Thus, during vehicle operation in the first forward speed stage, the first - third synchronizer sleeve 16f of the first - third synchronizer 16 is positioned to its rightwards position, so as to rotationally engage the first speed driven gear wheel 11 with the driven gear wheel shaft 10, and the second - fourth synchronizer sleeve 17f of the second - fourth synchronizer 17 is positioned to its central or intermediate position, and the first clutch assembly 200 is kept engaged while the engagement condition of the second clutch assembly 201 is irrelevant. Thus rotational power is transmitted from the crankshaft (not shown) of the internal combustion engine (also not shown) via the flywheel 23 and via the first clutch assembly 200 to the first driving gear wheel shaft 3, whence it is transmitted through the first speed driving gear wheel 5 to the first speed driven gear wheel 11 constantly meshed therewith, whence said drive is transmitted to the driven gear wheel shaft 10 to which said first speed driven gear wheel 11 is currently engaged, whence it is output via the power output gear wheel 15 to the differential gear mehanism 85. However, when it is desired to shift up to the second speed stage from the first speed stage, as a preparatory step first it is ensured that the second clutch assembly 201 is disengaged, and then the second - fourth synchronizer sleeve 17f of the second - fourth synchronizer 17 is shifted to its rightwards position, so as to rotationally engage the second speed driven gear wheel 12 with the driven gear wheel shaft 10, but at this time no drive will be transferred by this rotational engagement because the second clutch assembly 201 is disengaged. Then, in order to actually engage this second speed stage, i.e. to perform the upshift, the first clutch assembly 200 is disengaged and the second clutch assembly 201 is engaged, with a good mutual timing being maintained during this switching over of engagement conditions. Later, at a convenient time, the first - third synchronizer sleeve 16f of the first - third synchronizer 16 is brought back to its neutral or intermediate position, and thereafter the first clutch assembly 200 is kept disengaged.

Thus, during vehicle operation in the second forward speed stage, the second - fourth synchronizer sleeve 17f of the second - fourth synchronizer 17 is positioned to its rightwards position, so as to rotationally engage the second speed driven gear wheel 12 with the driven gear wheel shaft 10, and the first - third synchronizer sleeve 16f of the first - third synchronizer 16 is positioned to its central or intermediate position, and the second clutch assembly 201 is kept engaged while the first clutch assembly 200 is kept disengaged. Thus rotational power is transmitted from the crankshaft of the internal combustion engine via the flywheel 23 and via the second clutch assembly 201 to the second driving gear wheel shaft 4, whence it is transmitted through the second speed driving gear wheel 8 to the second speed driven gear wheel 12 constantly meshed therewith, whence said drive is transmitted to the driven gear wheel shaft 10 to which said second speed driven gear wheel 12 is currently engaged, whence it is output via the power output gear wheel 15 to the differential gear mechanism 85. However, when it is desired to shift up to the third speed stage from the second speed stage, or alternatively down to the first speed stage, respectively, as a preparatory step first the first - third synchronizer sleeve 16f of the first - third synchronizer 16 is shifted respectively either to its leftwards or to its rightwards position, so as to rotationally engage either the third speed driven gear wheel 13 or the first speed driven gear wheel 11 with the driven gear wheel shaft 10, but at this time no drive will be transferred by this rotational engagement because the first clutch assembly 200 is still disengaged. Then, in order to actually engage respectively either the third or the first speed stage, i.e. to perform the respective upshift or downshift, the first clutch assembly 200 is engaged and the second clutch assembly 201 is disengaged, again with a good mutual timing being maintained during this switching over of engagement conditions. Later, at a convenient time, the second - fourth synchronizer sleeve 17f of the second - fourth synchronizer 17 is brought back to its neutral or intermediate position, and thereafter the engagement condition of the second clutch assembly 201 becomes irrelevant.

Thus, during vehicle operation in the third forward speed stage, the first - third synchronizer sleeve 16f of the first - third synchronizer 16 is positioned to its leftwards position, so as to rotationally engage the third speed driven gear wheel 13 with the driven gear wheel shaft 10, and the second - fourth synchronizer sleeve 17f of the second - fourth synchronizer 17 is positioned to its central or intermediate position, and the first clutch assembly 200 is kept engaged while the engagement condition of the second clutch assembly 201 is irrelevant. Thus rotational power is transmitted from the crankshaft of the internal combustion engine via the flywheel 23 and via the first clutch assembly 200 to the first driving gear wheel shaft 3, whence it is transmitted through the third speed driving gear wheel 6 to the third speed driven gear wheel 13 constantly meshed therewith, whence said drive is transmitted to the driven gear wheel shaft 10 to which said third speed driven gear wheel 13 is currently engaged, whence it is output via the power output gear wheel 15 to the differential gear mechanism 85. However, when it is desired to shift up to the fourth speed stage from the third speed stage, or alternatively down to the second speed stage, respectively, as a preparatory step first it is ensured that the second clutch assembly 201 is disengaged, and then the second - fourth synchronizer sleeve 17f of the second - fourth synchronizer 17 is shifted respectively either to its leftwards or to its rightwards position, so as to rotationally engage either the fourth speed driven gear wheel 14 or the second speed driven gear wheel 12 with the driven gear wheel shaft 10, but at this time no drive will be transferred by this rotational engagement because the second clutch assembly 201 is disengaged. Then, in order to actually engage respectively either the fourth or the second speed stage, i.e. to perform the respective upshift or downshift, the second clutch assembly 201 is engaged and the first clutch assembly 200 is disengaged, again with a good mutual timing being maintained during this switching over of engagement conditions. Later, at a convenient time, the first - third synchronizer sleeve 16f of the first - third synchronizer 16 is brought back to its neutral or intermediate position, and thereafter the first clutch assembly 200 is kept disengaged.

Thus, during vehicle operation in the fourth forward speed stage, the second - fourth synchronizer sleeve 17f of the second - fourth synchronizer 17 is positioned to its leftwards position, so as to rotationally engage the fourth speed driven gear wheel 14 with the driven gear wheel shaft 10, and the first - third synchronizer sleeve 16f of the first - third synchronizer 16 is positioned to its central or intermediate position, and the second clutch assembly 201 is kept engaged while the first clutch assembly 200 is kept disengaged. Thus rotational power is transmitted from the crankshaft of the internal combustion engine via the flywheel 23 and via the second clutch assembly 201 to the second driving gear wheel shaft 4, whence it is transmitted through the fourth speed speed driving gear wheel 9 to the second speed driven gear wheel 14 constantly meshed therewith, whence said drive is transmitted to the driven gear wheel shaft 10 to which said fourth speed driven gear wheel 14 is currently engaged, whence it is output via the power output gear wheel 15 to the differential gear mechanism 85. However, when it is desired to shift down to the third speed stage, as a preparatory step first the first - third synchronizer sleeve 16f of the first - third synchronizer 16 is shifted to its leftwards position, so as to rotationally engage the third speed driven gear wheel 13 with the driven gear wheel shaft 10, but at this time no drive will be transferred by this rotational engagement because the first clutch assembly 200 is disengaged. Then, in order to actually engage the third speed stage, i.e. to perform the downshift, the first clutch assembly 200 is engaged and the second clutch assembly 201 is disengaged, again with a good mutual timing being maintained during this switching over of engagement conditions. Later, at a convenient time, the second - fourth synchronizer sleeve 17f of the second - fourth synchronizer 17 is brought back to its neutral or intermediate position, and thereafter the engagement condition of the second clutch assembly 201 becomes irrelevant.

Finally, during vehicle operation in the reverse speed stage, the first - third synchronizer sleeve 16f of the first - third synchronizer 16 and of the second - fourth synchronizer sleeve 17f of the second - fourth synchronizer 17 are both positioned to their central or intermediate positions, and the reverse idler gear wheel 20 is shifted to the left in FIGS. 1 and 2 along the axial direction of the reverse idler gear wheel shaft 19, so as to mesh with the reverse speed driving gear wheel 7 and with the reverse speed driven gear wheel 18 formed on the outside of the first - third synchronizer sleeve 16f, and the first clutch assembly 200 is engaged while the second clutch assembly 201 is disengaged. Thus at this time rotational power is transmitted from the crankshaft of the internal combustion engine via the flywheel 23 and via the first clutch assembly 200 to the first driving gear wheel shaft 3, whence it is transmitted through the reverse speed driving gear wheel 7 and the reverse idler gear wheel 20 and the reverse speed driven gear wheel 18 to the driven gear wheel shaft 10, whence it is output via the power output gear wheel 15 to the differential gear mechanism 85, now in a reverse rotational sense to the previous forward driving one, since one more gear wheel, the reverse idler gear wheel 20, is present in the rotational force transmission path.

Now, referring to FIG. 3, the arrangements for providing selective engagement and disengagement of the first and second clutch assemblies 200 and 201 by selectively providing supply of hydraulic fluid pressure to the pressure chambers 44 and 96, and for moving the selector forks 57, 60 and 61 by selectively providing supply of hydraulic fluid pressure to the pressure chambers 83, 72, 73, 77, and 78, according to operational parameters of the vehicle comprising this transmission mechanism, will be described. A hydraulic fluid pump 100 sucks up hydraulic fluid from a pan 101, and the pressure of this hydraulic fluid is regulated to a line hydraulic fluid pressure by a line pressure regulation valve 102 of a per se well known sort. From this line pressure regulation valve 102, via a hydraulic fluid conduit 103, and then via hydraulic fluid conduits 104, 105, 106, 107, 108, 109, and 110 respectively, hydraulic fluid at substantially line pressure is led to input ports designated as "a" of seven electromagnetic fluid switching valves, which are respectively designated as 111, 112, 113, 114, 115, 116, and 117, and which are only schematically shown because they are per se well known. These electromagnetic fluid switching valves are all of substantially identical construction and function, and each of them has three ports designated as "a", "b", and "c", and functions as follows: when its solenoid (not shown) is supplied with actuating electrical energy then its port "a" is communicated to its port "b" while its port "c" is not communicated to any other port, and on the other hand when its solenoid is not supplied with actuating electrical energy then its port "b" is communicated to its port "c" while its port "a" is not communicated to any other port. Thus, when the solenoid of each of these electromagnetic fluid switching valves 111 through 117 is supplied with an electrical pulse signal with a certain duty ratio, the effective fluid flow resistance between its port "a" and its port "b" varies according to the duty ratio of said certain pulse signal, being the less the greater is said duty ratio; and correspondingly the effective fluid flow resistance between its port "b" and its port "c" also varies according to the duty ratio of said certain pulse signal, being the greater the greater is said duty ratio. The ports "c" of the electromagnetic fluid switching valves 111, 112, 113, 114, 115, 116, and 117 are all communicated via drain hydraulic fluid conduits 125, 126, 127, 128, 129, 130, and 131 respectively to the hydraulic fluid pan 101.

Now, the other connections of these electromagnetic fluid switching valves are as follows. The port "b" of the electromagnetic fluid switching valve 111 is communicated via a hydraulic fluid conduit 118 to the pressure chamber 96 of the hydraulic actuator 95 for the clutch fork member 34 of the first clutch assembly 200. The port "b" of the electromagnetic fluid switching valve 112 is communicated via a hydraulic fluid conduit 119 and via the previously mentioned hydraulic fluid conduit 51 formed through the center of the second driving gear wheel shaft 4 to the pressure chamber 44 of the second clutch assembly 201. The port "b" of the electromagnetic fluid switching valve 113 is communicated via the previously mentioned hydraulic fluid conduit 120 to the pressure chamber 72 of the first hydraulic actuator 68 which is for driving the first selector fork shaft 58, the first selector fork 60, and thereby the first - third selector sleeve 16f of the first - third synchronizer 16 rightwards, i.e. for engaging the first speed stage. The port "b" of the electromagnetic fluid switching valve 114 is communicated via the previously mentioned hydraulic fluid conduit 121 to the pressure chamber 77 of the second hydraulic actuator 69 which is for driving the second selector fork shaft 59, the second selector fork 61, and thereby the second - fourth selector sleeve 17f of the second - fourth synchronizer 17 rightwards, i.e. for engaging the second speed stage. The port "b" of the electromagnetic fluid switching valve 115 is comunicated via the previously mentioned hydraulic fluid conduit 122 to the pressure chamber 73 of the first hydraulic actuator 68 which is for driving the first selector fork shaft 58, the first selector fork 60, and thereby the first - third selector sleeve 16f of the first - third synchronizer 16 leftwards, i.e. for engaging the third speed stage. The port "b" of the electromagnetic fluid switching valve 116 is communicated via the previously mentioned hydraulic fluid conduit 123 to the pressure chamber 78 of the second hydraulic actuator 69 which is for driving the second selector fork shaft 59, the second selector fork 61, and thereby the second - fourth selector sleeve 17f of the second - fourth synchronizer 17 leftwards, i.e. for engaging the fourth speed stage. Finally, the port "b" of the electromagnetic fluid switching valve 117 is communicated via a hydraulic fluid conduit 124 to the pressure chamber 83 of the aforementioned hydraulic actuator 81 which is for driving the reverse speed selector fork 57 and the reverse idler gear wheel 20 in the leftwards direction, i.e. for engaging the reverse speed stage.

The selective supply of electrical energy, i.e. of pulse signals of various duty ratios, to the solenoids of each of the seven electromagnetic fluid switching valves 111, 112, 113, 114, 115, 116, and 117 is performed from an electrical control device 140, the internal construction of which will not be explained in detail here because it is generally per se well known and conventional, and because the particular features thereof which are specific to the shown preferred embodiment of the present invention will be easily supplemented by one of ordinary skill in the electronic and programming arts, based upon the functional disclosures herein. In the shown preferred embodiment, this electrical control device 140 may comprise a microprocessor and one or more pulse signal generators controlled by said microprocessor which can generate pulse signals of any desired duty ratio within a certain range, and also may comprise a multiplexer or the like for directing said pulse signals to one or more of the solenoids of the seven electromagnetic fluid switching valves 111, 112, 113, 114, 115, 116, and 117. In any case, the electrical control device 140 receives information relating to the operational conditions of the transmission system shown in FIG. 2 and the operational conditions of the vehicle in which said transmission system is incorporated from, in this preferred embodiment of the present invention: a throttle opening amount sensor 141 which produces an electrical output signal representative of the current throttle opening amount of the engine (not shown) of the vehicle, i.e. of the the current value of the load on said engine; a vehicle speed sensor 142 which produces an electrical output signal representative of the current value of the road speed of the vehicle; a shift position sensor 143 which produces an electrical output signal representative of the desired transmission range which is currently manually selected on a transmission range setting means (not shown) by the driver of the vehicle; and an engine rpm sensor 144 which produces an electrical output signal representative of the current value of the rotational speed of the engine (not shown) of the vehicle. Based upon this and possibly other information, the electrical control device 140 decides which speed stage of the transmission mechanism shown in FIG. 1 should currently be engaged or should be shifted to, according to predetermined transmission shifting patterns stored in a memory of said electrical control device 140 or the like; and the electrical control device 140 outputs suitable electrical pulse signals to one or more of the solenoids of the seven electromagnetic fluid switching valves 111, 112, 113, 114, 115, 116, and 117 for causing the shift forks 60, 61, and 57 and the first and second clutch assemblies 200 and 201 to be moved and engaged as explained in the appropriate part of the description given above with respect to the operation of the transmission system in each of its speed stages and with respect to the shifting between said speed stages.

In detail, considering the pulse signal output by said electrical control device to the solenoid of a particular one of the seven electromagnetic fluid switching valves 111, 112, 113, 114, 115, 116, and 117 which is currently suplying a non zero hydraulic fluid pressure from its port "b" to its associated one of the pressure chambers 96, 44, 72, 77, 73, 78, and 82 via the associated one of the hydraulic fluid conduits 118 through 124, during the ON time periods of this pulse signal said pressure chamber is communicated via the port "b" of said electromagnetic fluid switching valve to the pot "a" thereof so as to receive supply of line hydraulic fluid pressure; but on the other hand during the OFF time periods of said pulse signal said pressure chamber is communicated via the port "b" of said electromagnetic fluid switching valve to the port "c" thereof so as to be drained. Therefore, the greater is the duty ratio of this pulse signal supplied to the solenoid of the electromagnetic fluid switching valve, the greater is the balance value of the hydraulic fluid pressure which is thus caused to be present in said pressure chamber, from a zero pressure value in said pressure chamber when said duty ratio is zero up to a line pressure value in said pressure chamber when said duty ratio is unity. In this way, th electrical control device 140 can control the pressure value in any of the pressure chambers 96, 44, 72, 77, 73, 78, and 83 to be substantially any desired pressure value from substantially zero up to substantially line pressure, i.e. to be any desired value in a particular range.

Figure 4:
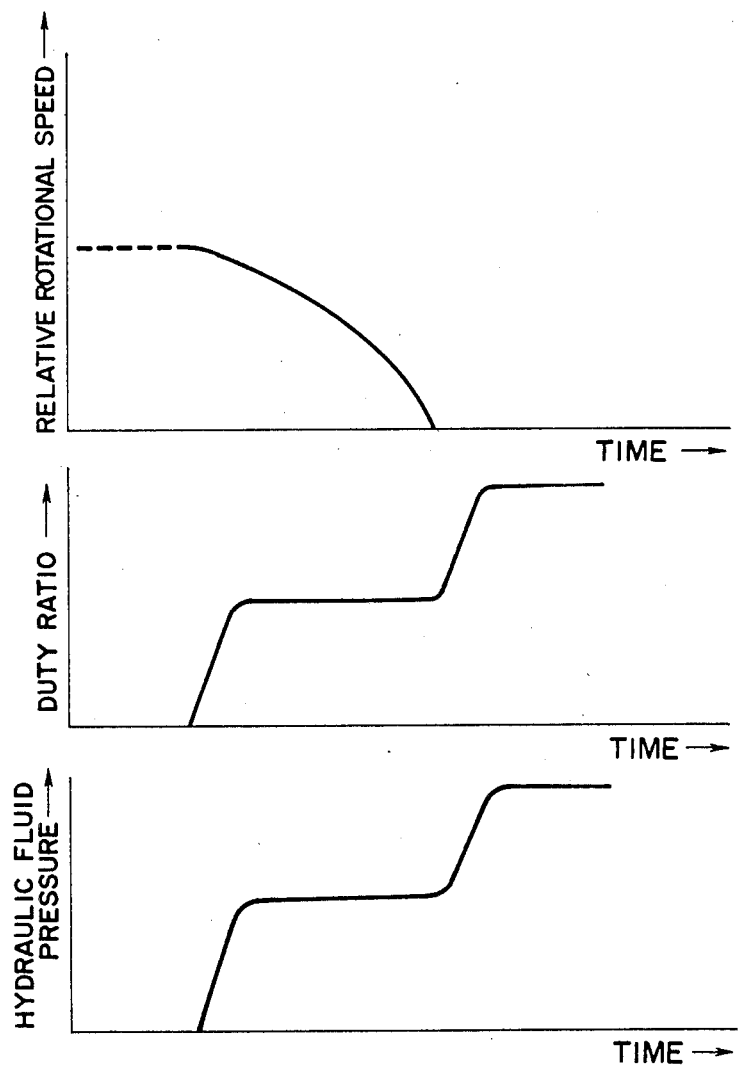
FIG. 4 is a set of three graphs illustrating the operation of the transmission and control system shown in FIGS. 1 through 3, in all of which time is shown along the horizontal axis, and in which, respectively, relative rotational speed of two members whose rotational speed is synchronized by a synchronizer, duty ratio of a pulse signal output by an electrical control device, and hydraulic fluid pressure supplied to a pressure chamber which drives said synchronizer, are shown along the vertical axes.

Now, referring to the graphs shown in FIG. 4, the particular principle of the present invention will be explained. In all of these three graphs, time is shown along the horizontal axis. In the upper one of these graphs the relative rotational speed between two members (i.e. between one of the driven gear wheels 11, 12, 13, or 14 and the driven gear wheel shaft 10) which are being synchronized together by a one of the transmission synchronizers (i.e. the synchronizer 16 or the synchronizer 17) is shown along the vertical axis; in the central one of these graphs the duty ratio of the pulse signal output by the electrical control device 140 to the one of the electromagnetic fluid switching valves 111 through 117 which controls supply of pressurized hydraulic fluid to the pressure chamber (i.e. the pressure chamber 72, 73, 77, or 78) which is currently driving the sleeve of said synchronizer is shown along the vertical axis; and in the lower one of these graphs the actual value of said hydraulic fluid pressure supplied to said pressure chamber is shown along the vertical axis. When it is desired to synchronize the relative rotation of these two members, then the electrical control device 140 does not suddenly start outputting an electrical signal of pulse ratio unity to said one of said electromagnetic switching valves, so as to start supplying full line hydraulic fluid pressure to said pressure chamber so as forcibly to move said synchronizer sleeve with the maximum possible force; on the contrary, the electrical control device 140 first outputs an electrical signal to said one of said electromagnetic switching valves whose duty ratio rises very quickly, as shown in the central graph of FIG. 4, to a value intermediate between zero and unity which is determined by the initial value of the relative rotational speed between said two members whose rotation is to be synchronized together, as determined by the electrical control device 140 based upon information from the vehicle road speed sensor 142 and/or the engine rpm sensor 144 which it receives and upon the knowledge which it of course has as to which speed stage of the gear transmission mechanism is currently engaged, said value in fact being determined to be the higher, the higher is the initial value of said relative rotational speed. By this manner of control it is ensured that the time required for synchronization of the two members to be synchronized in the speed stage shifting is made generally constant and the timing for engaging the clutches is precisely adjusted. From the point where it reaches this value, in this preferred embodiment, the duty ratio of the pulse signal is kept substantially constant, until the synchronization process is substantially completed and the rotational speeds of the two members whose rotation is being synchronized together have come to be substantially the same, and then the duty ratio of the pulse signal is very quickly raised to unity. Along with this variation of the duty ratio of the pulse signal supplied to the electromagnetic fluid switching valve, likewise the pressure supplied to the pressure chamber varies, as shown in the lower graph of FIG. 4, so as first to quickly rise to a value which is greater the greater is the initial value of the relative revolution speed between the two members whose revolution is to be synchronized, and then in this preferred embodiment is kept at substantially this value until the synchronization is completed, and then is quickly brought up to substantially line pressure. Thereby the synchronizer sleeve is moved with a force substantially proportional to this hydraulic fluid pressure value, and is similarly pressed against the cone member and the ring member of the synchronizer; and according thereto the relative rotational speed of said two members which are being synchronized together varies as shown in the upper graph of FIG. 4.

Thus, it will be understood that the initial actuating force used for pushing the synchronizer sleeve is determined to be less than the final actuating force for pushing the synchronizer sleeve at the completion of the synchronization process, according to the value of the inital relative rotational speed between the two members whose synchronization is being performed. Further, the initial actuating force used for pushing the synchronizer sleeve may be modified according to which speed stage the current shifting of the synchronizer sleeve is to establish. When, for example, the transmission is shifted up from the first speed stage to the second speed stage when the vehicle is running, the second - fourth synchronizer sleeve 17f is shifted rightwards so as to speed up the second speed driven gear 12 generally from its stationary stage and to rotationally connect it to the driven gear wheel shaft 10. In this case the frictional power transmitting engagement between the second speed cone member 17b and the synchronizer ring 17d must be strong enough to speed up the rotary mass of the second driving gear wheel shaft 4 and the clutch disk assembly 45 rotationally connected to the shaft 4 via an overdrive gear system consisting of the second speed reduction system gears 8 and 12. In a similar manner, when the transmission is shifted up from the second speed stage to the third speed stage when the vehicle is running, the frictional power transmitting engagement between the third speed cone member 16c and the synchronizer ring 16e must be strong enough to speed up the rotary mass of the first hollow driving gear wheel shaft 3 and the clutch disk assembly 35 rotationally connected to the shaft 3 via an overdrive gear system consisting of the third speed reduction system gears 6 and 13. From these facts, it will be understood that the frictional power transmitting engagement between the driving member and the driven member of the synchronizer mechanism, i.e. the pressing force by which the driving member is pressed against the driven member, needs to be stronger the lower is the speed stage to which the transmission is shifted via the synchronizing operation of the synchronizer. In this connection, it will be understood that with respect to a particular speed stage such as the second or the third speed stage the pressing force by which the driving member is pressed against the driven member in the synchronization mechanism needs to be greater in downshifting than in upshifting, because the vehicle speed at which downshifting to a particular speed stage, e.g. the second speed stage, is performed is generally higher than the vehicle speed at which upshifting to the particular speed stage is performed.

Although the present invention has been shown and described with reference to a preferred embodiment thereof, and in terms of the illustrative drawings, it should not be considered as limited thereby. Various possible modifications, omissions, and alterations could be conceived of by one skilled in the art to the form and the content of this preferred embodiment, without departing from the scope of the present invention. Therefore it is desired that the scope of the present invention, and of the protection sought to be granted by Letters Patent, should be defined not by any of the perhaps purely fortuitous details of the shown preferred embodiment, or of the drawings, but solely by the scope of the appended claims, which follow.

What is claimed is:

1. In a transmission for a vehicle, comprising a rotary power input member, a rotary power output member, and a synchronizer for selectively torque-transmittingly connecting said power input member to said power output member, said synchronizer comprising a first rotary member rotatably around an axis and constantly torque-transmittingly connected with said power input member, a second rotary member rotatably around said axis and constantly torque-transmittingly connected with said power output member, a synchronizer sleeve rotatable around said axis and constantly torque-transmittingly connected with one of said first and second rotary members, said synchronizer sleeve being axially movable relative to said one rotary member so far as torque-transmittingly to mesh with the other of said first and second rotary members, and a synchronizer ring rotatable around said axis and torque-transmittingly connected with said one rotary member when said synchronizer sleeve is axially moved toward said other of said first and second rotary members, said synchronizer ring being frictionally engagable with said other rotary member so as to make rotations of said first and second rotary members approach to one another toward synchronization therebetween when frictionally pressed against said other rotary member, an actuation system, comprising:

(a) an actuator which selectively drives said synchronizer sleeve and synchronizer ring together toward and away from said other rotary member so as, when said synchronizer sleeve and synchronizer ring are driven toward said other rotary member, first to engage said synchronizer ring frictionally with said other rotary member and then to engage said synchronizer sleeve as torque-transmittingly meshed with said other rotary member; and (b) a control system which controls operation of said actuator so as, when said synchronizer sleeve and synchronizer ring are driven toward said other rotary member, to vary the force of frictionally pressing said synchronizer ring against said other rotary member in relation to the difference of rotational speed between said first and second rotary members so that said force of frictional pressing is substantially lower when said difference of rotational speed substantially exists than a final value after said difference of rotational speed has substantially disappeared, wherein said force of frictional pressing is aburptly and substantially increased up to said final value at the time when said difference of rotational speed is reduced substantially to zero.

2. An actuation system according to claim 1, wherein said force of frictionally pressing said synchronizer ring to said other rotary member when said difference of rotational speed substantially exists is applied to be substantially constant.

3. An actuation system according to claim 1, wherein said force of frictionally pressing said synchronizer ring to said other rotary member when said difference of rotational speed substantially exists is applied to be greater as vehicle speed at the moment when synchronization is initiated is higher.

4. An actuation system according to claim 1, wherein said force of frictionally pressing said synchronizer ring to said other rotary member when said difference of rotational speed substantially exists is applied to be greater as the speed stage to which the transmission is shifted is lower.

5. An actuation system according to claim 1, wherein said actuator is a hydraulic actuator which is actuated by supply of an actuating hydraulic fluid pressure thereto, and said control system is an electro-hydraulic system which supplies said actuating hydraulic fluid pressure to said hydraulic actuator according to an electric processing of control data supplied thereto.

* * * * *